(12) United States Patent
Poulsen

(10) Patent No.: US 7,542,205 B2
(45) Date of Patent: Jun. 2, 2009

(54) MULTI-OBJECT CONTROLLED-DEPTH MATRIX LAYER STRUCTURE AND MANUFACTURING PROCESS

(75) Inventor: Peter D. Poulsen, Grants Pass, OR (US)

(73) Assignee: Merlin Technology Limited Liability Company, Grants Pass, OR (US)

( * ) Notice: Subject to any disclaimer, the term of this patent is extended or adjusted under 35 U.S.C. 154(b) by 504 days.

(21) Appl. No.: 11/188,147

(22) Filed: Jul. 22, 2005

(65) Prior Publication Data
US 2006/0017991 A1 Jan. 26, 2006

Related U.S. Application Data

(60) Provisional application No. 60/590,767, filed on Jul. 23, 2004.

(51) Int. Cl.
G03B 21/60 (2006.01)
(52) U.S. Cl. ........................ 359/452; 428/143
(58) Field of Classification Search ................ 359/452, 359/453
See application file for complete search history.

(56) References Cited

U.S. PATENT DOCUMENTS

| | | | | |
|---|---|---|---|---|
| 5,706,134 A | * | 1/1998 | Konno et al. ............... 359/599 |
| 6,144,491 A | * | 11/2000 | Orikasa et al. .............. 359/452 |
| 6,747,796 B1 | * | 6/2004 | Dorling ...................... 359/452 |
| 6,859,314 B2 | * | 2/2005 | Yoon et al. .................. 359/452 |
| 6,963,447 B2 | * | 11/2005 | Honda ........................ 359/452 |
| 7,164,536 B2 | * | 1/2007 | Whitehead ................... 359/618 |
| 7,248,406 B2 | * | 7/2007 | May et al. ................... 359/452 |
| 2006/0198020 A1 | * | 9/2006 | Hannington ................. 359/453 |

* cited by examiner

*Primary Examiner*—Christopher Mahoney
(74) *Attorney, Agent, or Firm*—Martin & Associates, L.L.C.; Derek P. Martin

(57) ABSTRACT

A controlled-depth matrix layer structure is formed by floating a plurality of geometric shapes in a solidifiable liquid, then solidifying the liquid to entrap the plurality of geometric shapes in a layer. Multiple layers of liquid may be used, one or more of which may be solidifiable, so long as the sum of displaced masses of all the layers is greater than the mass of the geometric shapes, thereby causing the geometric shapes to float. The resulting structure after solidification of the solidifiable layer is a solidified layer interconnecting the plurality of geometric shapes, wherein each of the plurality of geometric shapes is within the solidified layer a specified percentage. The geometric shapes are preferably of different sizes, and may be spheres, hemispheres, or other suitable shapes, and may be hollow, solid, transparent or reflective.

8 Claims, 11 Drawing Sheets

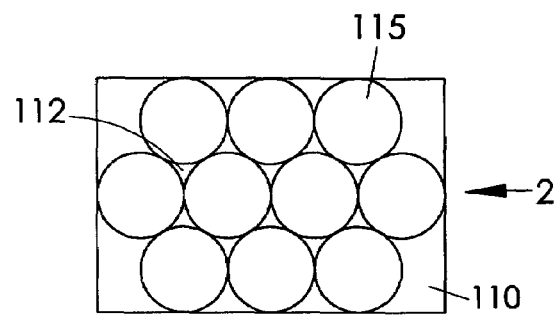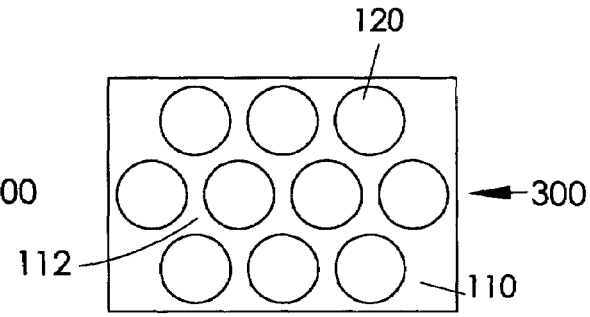
FIG. 2A  FIG. 3A
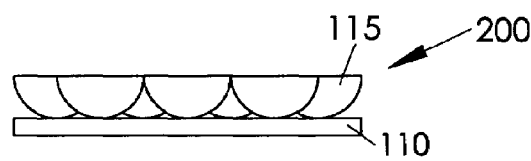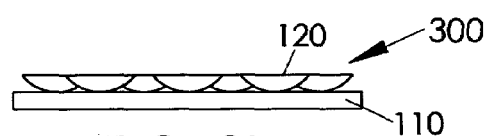
FIG. 2B  FIG. 3B
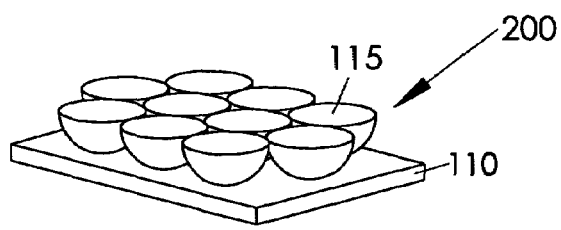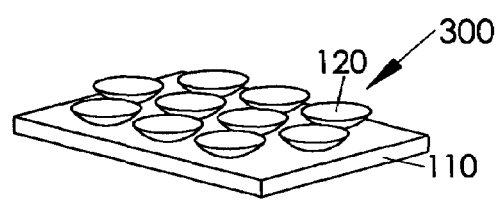
FIG. 2C  FIG. 3C

MULTI-OBJECT CONTROLLED-DEPTH MATRIX LAYER STRUCTURE AND MANUFACTURING PROCESS

RELATED APPLICATION

This patent application claims the benefit of U.S. Provisional Application No. 60/590,767 entitled "A Multi-Object Controlled-Depth Matrix Layer System", filed on Jul. 23, 2004, which is incorporated herein by reference.

BACKGROUND OF THE INVENTION

1. Technical Field

This invention generally relates to optical devices, and more specifically relates to optical devices and methods that are formed from multiple objects.

2. Background Art

Modern projection screens have been developed that provide greater than unity gain by including multiple convex and/or concave elements in an array. For example, one known configuration includes an array of small square elements. Each of the square elements are reflective, and are formed into a convex shape to reflect projected light in a manner that improves the optical characteristics of the screen by enhancing the fraction of projected light directed towards viewers and reducing the fraction of reflected ambient light directed towards the viewers.

One problem with known methods for forming such arrays of elements is the cost and technical difficulty of achieving an array that has selectable or consistent effective curvatures between elements. Further, the resulting screens are not able to provide high gain and/or sharp angular cut-off. The sharp angular cut-off is particularly important for rejecting background light impinging from off axis and for allowing the overlay of multiple, angularly separable images.

DISCLOSURE OF INVENTION

According to the preferred embodiments, a controlled-depth matrix layer structure is formed by floating a plurality of geometric shapes in a solidifiable liquid, then solidifying the liquid to entrap the plurality of geometric shapes in a layer. Multiple layers of liquid may be used, one or more of which may be solidifiable, so long as the sum of displaced masses of all the layers is greater than the mass of the geometric shapes causing the displacement, such displacement thereby causing the geometric shapes to suspend. The resulting structure after solidification of the solidifiable layer is a solidified layer interconnecting the plurality of geometric shapes, wherein each of the plurality of geometric shapes is within the solidified layer a specified percentage. The geometric shapes are preferably of different sizes, and may be spheres, hemispheres, or other suitable shapes, and may be hollow, solid, transparent or reflective.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2A is a top view of an array of equal-diameter hemispheres on a flat substrate;

FIG. 2B is a side view of the array of equal-diameter hemispheres shown in FIG. 2A;

FIG. 2C is a perspective view of the array of equal-diameter hemispheres shown in FIGS. 2A and 2B;

FIG. 3A is a top view of an array of partial equal-diameter spheres on a flat substrate;

FIG. 3B is a side view of the array of partial equal-diameter spheres shown in FIG. 3A;

FIG. 3C is a perspective view of the array of partial equal-diameter spheres shown in FIGS. 3A and 3B;

BEST MODE FOR CARRYING OUT THE INVENTION

1.0 Overview

The present invention relates to the generation of a layer structure, such as a high-gain projection screen. For those not familiar with high-gain projection screens, this Overview section will provide background information that will help to understand the present invention.

High-Gain Projection Screens

Reflective high-gain projection screens have been developed that improve the reflectance of projected light to a desired viewing area while decreasing the reflectance of ambient light to the viewing area. One known high-gain projection screen uses an array of square reflective elements. These square reflective elements are formed into convex shapes, which provide the desired high gain. Known manufacturing techniques for forming the convex squares are expensive, and achieving an array that has a high degree of uniformity of curvature between all of the concave squares is difficult.

Figure 1A:
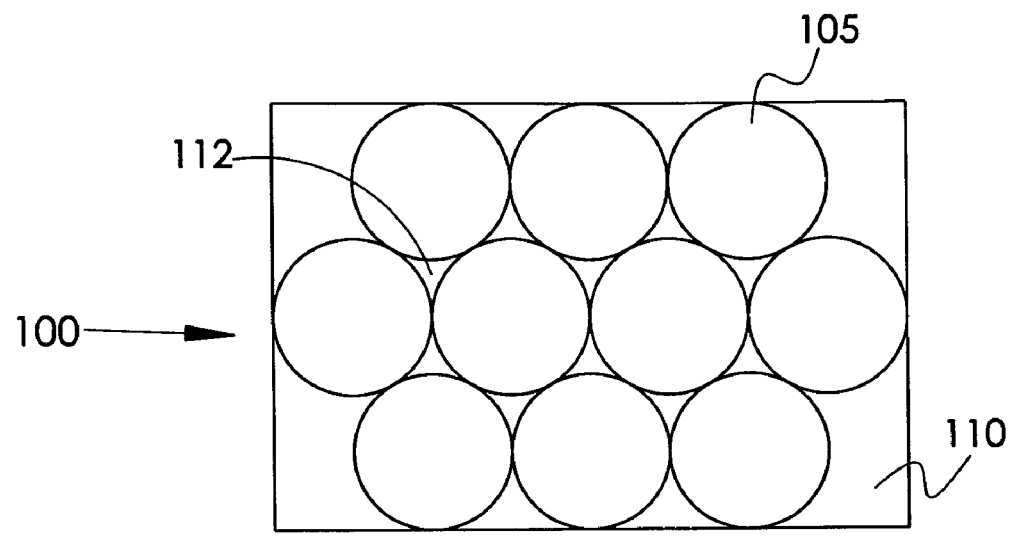
FIG. 1A is a top view of an array of equal-diameter spheres placed atop a flat substrate.
Figure 1B:
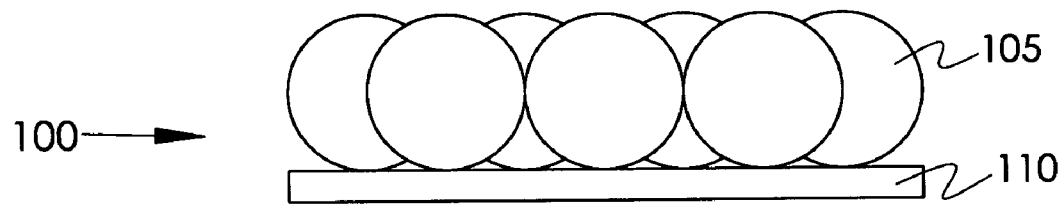
FIG. 1B is a side view of the array of equal-diameter spheres shown in FIG. 1A.
Figure 1C:
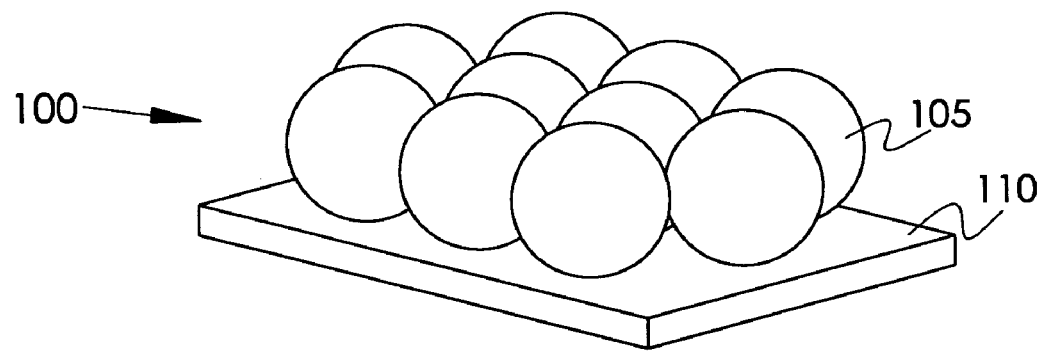
FIG. 1C is a perspective view of the array of equal-diameter spheres shown in FIGS. 1A and 1B.

Referring to FIGS. 1A-1C, one possible configuration for a reflective screen 100 includes an array of reflective spheres 105 on a substrate 110. The problem with this approach is the gaps (e.g., 112) between the spheres 105 that do not reflect light in the same way that the reflective spheres reflect light. As a result, the performance of a screen with the reflective spheres shown in FIGS. 1A-1C suffers due to the gaps between the spheres.

Referring to FIGS. 2A-2C, another specific type of reflective screen 200 includes hemispheres 115 placed in an array on a substrate 110. If we assume these hemispheres are shells (i.e., with a hollow center), the resulting screen will better reflect the projected light and better disperse the ambient light than flat screens. Note, however, that the array of hemispheres in FIGS. 2A-2C also include gaps (e.g., 112) between the hemispheres. For this reason, the performance of a reflective projection screen manufactured as shown in FIGS. 2A-2C will suffer due to the gaps between the hemispheres. Note that the screen 200 in FIGS. 2A-2C could be formed by removing the upper halves of all of the spheres 105 in the screen in FIGS. 1A-1C.

Referring to FIGS. 3A-3C, yet another specific type of reflective screen 300 includes an array of partial spheres 120 on a substrate 110. Such an array could be formed by taking the array shown in FIGS. 1A-1C, and removing most of the upper portions of the spheres. As shown most clearly in FIG. 3A, the gaps between the sphere portions is even greater than with the hemispheres in FIG. 2A, further reducing the performance of the screen.

2.0 Description of the Preferred Embodiments

Figure 4A:
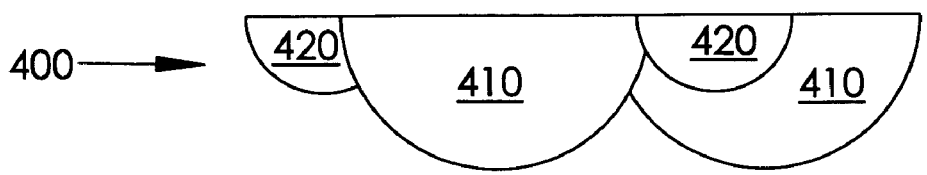
FIG. 4A is a side view of an array of different-sized spheres within the scope of the preferred embodiments.
Figure 4B:
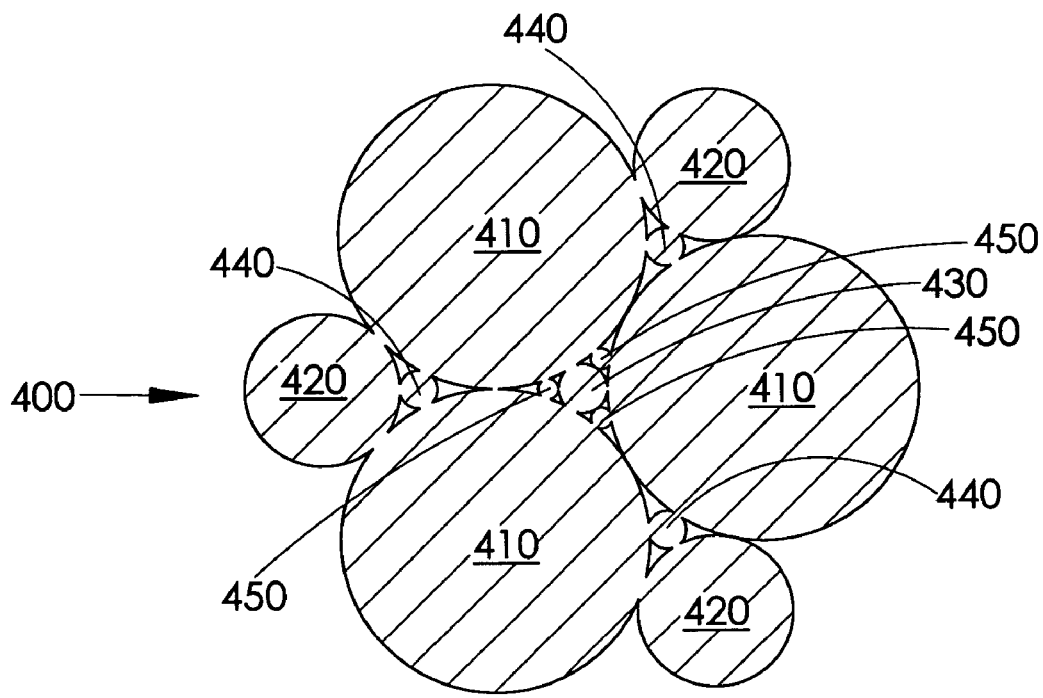
FIG. 4B is a top view of the array of different-sized spheres in FIG. 4A.
Figure 4C:
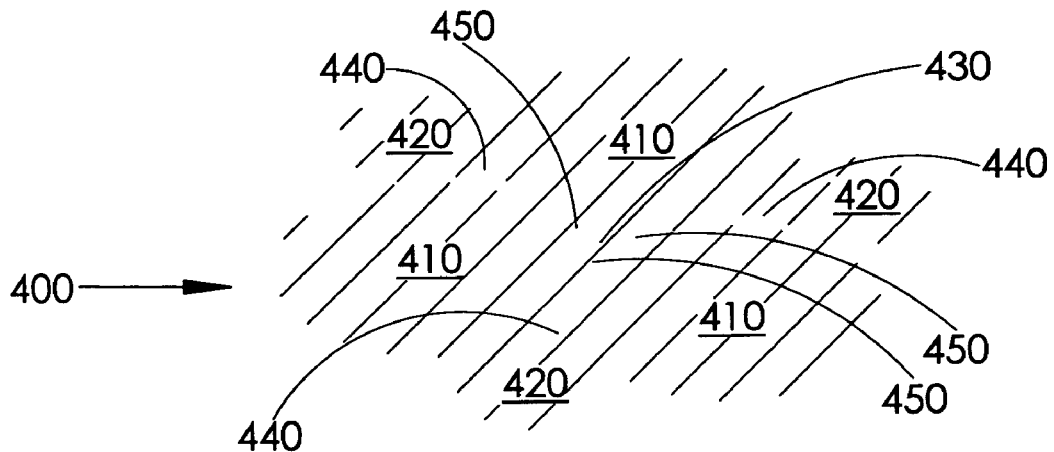
FIG. 4C is a perspective view of the array of different-sized spheres shown in FIGS. 4A and 4B.

The preferred embodiments recognize that an improved screen structure may include elements of different sizes. The elements of different sizes allow reducing the area of the screen in the gaps, thereby enhancing performance of the screen. Referring to FIGS. 4A-4C, an array 400 is shown that includes five different sizes of spheres, represented by 410, 420, 430, 440 and 450. Three spheres of size 410 are shown. Three spheres of size 420 are shown. On sphere of size 430 is shown. Three spheres of size 440 are shown. And three spheres of size 450 are shown. As shown best in FIG. 4B, the different sized spheres allow packing the smaller spheres into the gaps that would normally result between the largest spheres. The optical geometric reflection and refraction characteristics for each sphere, or portion of a sphere, are identical, regardless of their size as long as the proportions relative to the total sphere are the same. So filling the gaps with smaller sized spheres results in a screen that has substantially improved performance when compared to the screens that start with identically-sized spheres, as shown in FIGS. 1A-3C. Note that the hemispheres in FIGS. 4A-4C are shown as solid hemispheres, but the preferred embodiments expressly extend to the use of hollow spheres as well.

Figure 5A:
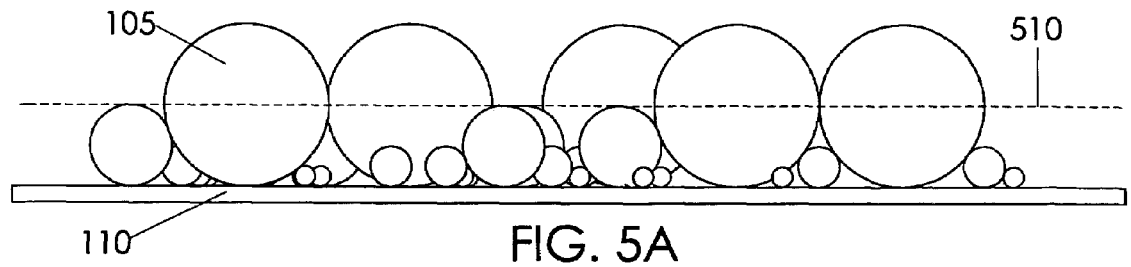
FIG. 5A is a side view of an array of different-sized spheres placed atop a flat substrate, with a line that bisects the largest spheres.
Figure 5B:
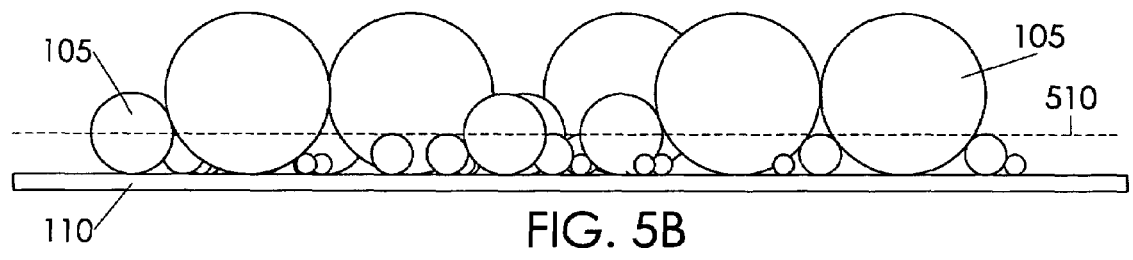
FIG. 5B is a side view of an array of different-sized spheres placed atop a flat substrate, with a line that bisects the next-to-the-largest spheres.
Figure 5C:
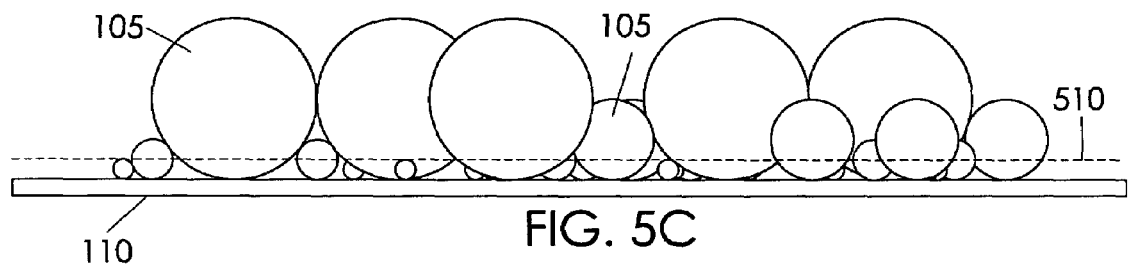
FIG. 5C is a side view of an array of different-sized spheres placed atop a flat substrate, with a line that bisects the next-to-the-smallest spheres.
Figure 5D:
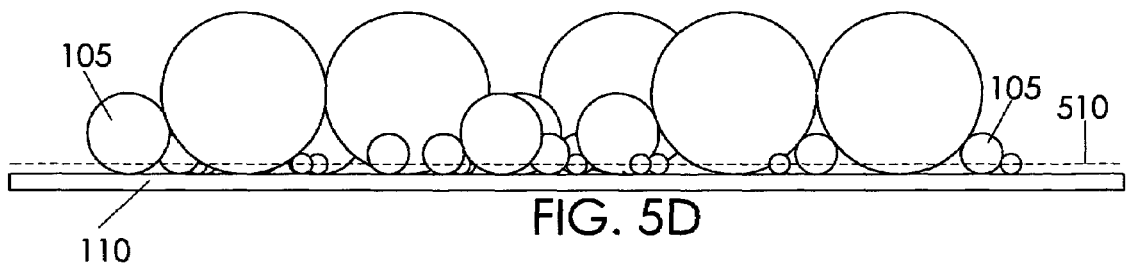
FIG. 5D is a side view of an array of different-sized spheres placed atop a flat substrate, with a line that bisects the smallest spheres.

FIGS. 5A-5D show the effect of placing different-sized spheres on a substrate 110. Because the plane of the substrate 110 is where each sphere touches, the center-lines of the different sized spheres will be offset from each other. Thus, one could decide to remove the material above the dotted line 510 in FIG. 5A, but this would leave all but the largest spheres untouched. Because the largest spheres would be cut into hemispheres and the spheres in between the largest spheres would be untouched, the optical characteristics of the screen would be inconsistent. Of course, one could always choose to bisect the next-to-the-largest spheres by removing the material above line 510 in FIG. 5B. This also leaves the smaller spheres untouched, while now leaving less than a hemisphere for the largest spheres. Similar scenarios for lines 510 in FIGS. 5C and 5D illustrate that it would be difficult to achieve a screen with consistent optical characteristics using spheres of different sizes placed atop a substrate because the relative proportion of the spheres are different for each different sphere diameter.

Figure 6A:
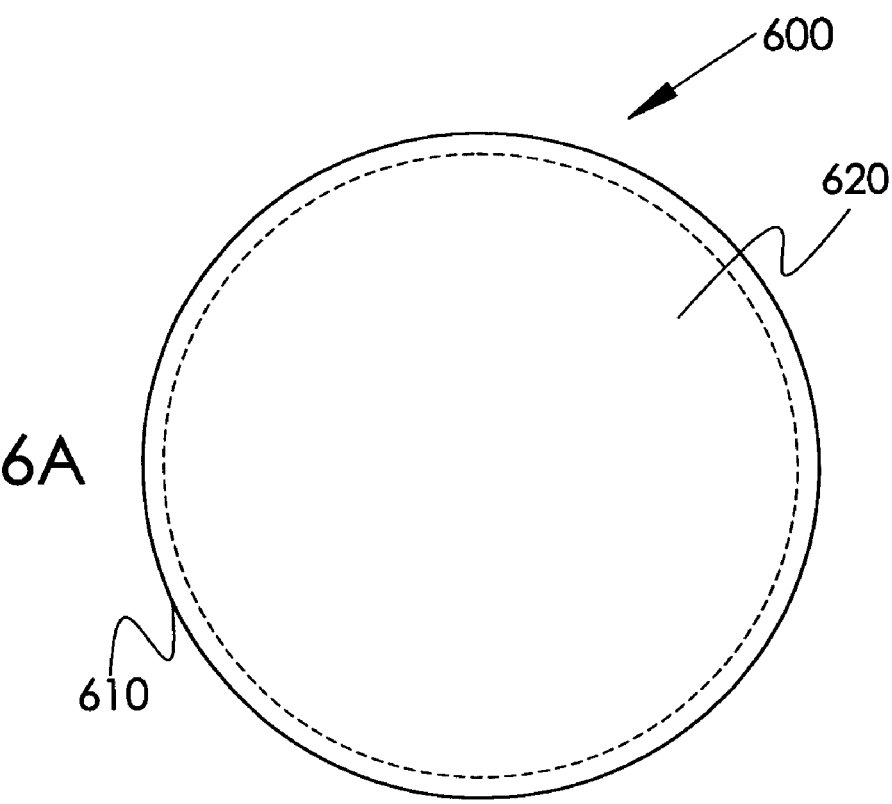
FIG. 6A shows a sphere in accordance with the preferred embodiments that includes a shell surrounding a hollow center.
Figure 6B:
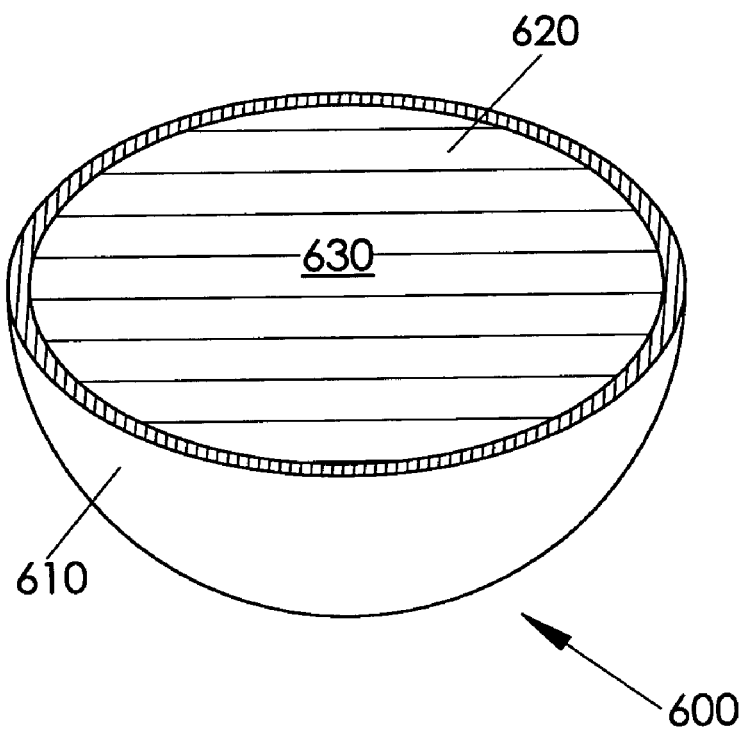
FIG. 6B shows a sphere in accordance with the preferred embodiments that includes a shell surrounding a second material.

The preferred embodiments include a variety of different geometric shapes. For the sake of the figures herein, spheres are shown, but the preferred embodiments expressly extend to any geometric shape, whether hollow, solid, closed, or open. Referring to FIG. 6A, a sphere 600 in accordance with the preferred embodiment may include an outer shell 610 and a substantially hollow interior 620. Note that the substantially hollow interior may be filled with a suitable filler to give the sphere 600 a desired average density. The filling may be in any suitable form, including gas, liquid, solid, granulated, etc. FIG. 6B shows a solid filling 630 in the hollow interior 620. Of course, the sphere 600 could be fabricated from a single, solid material, such as steel, plastic or glass. In addition, the sphere 600 could be coated with a suitable reflective coating, if desired.

Figure 7A:
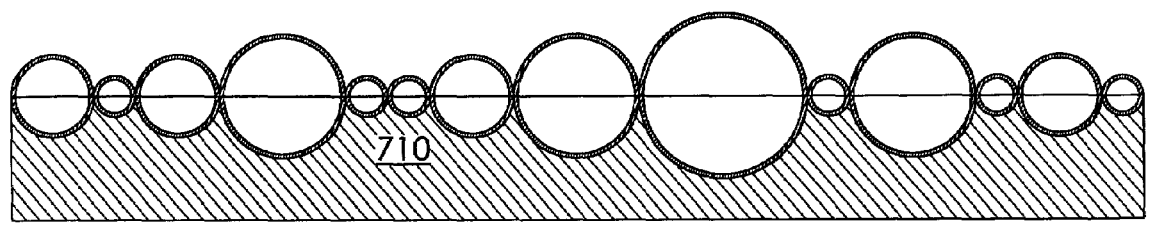
FIG. 7A is a cross-sectional view of a plurality of hollow geometric shapes suspended in a liquid in accordance with the preferred embodiments.
Figure 7B:
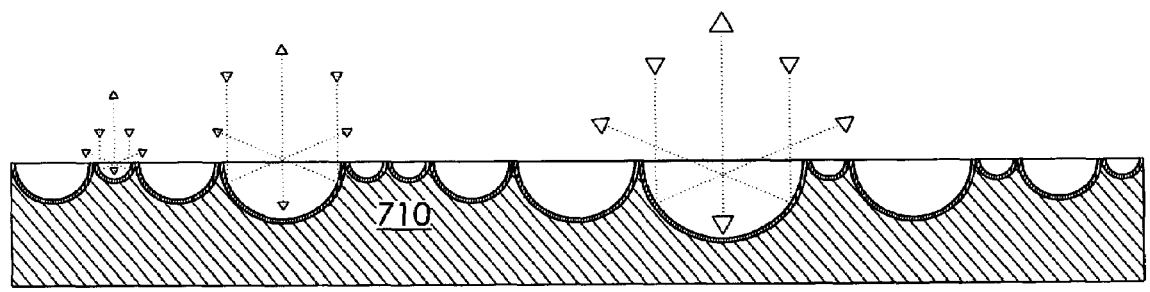
FIG. 7B is a cross-sectional view of the plurality of geometric shapes in FIG. 7A after the liquid has been solidified and after the top portions of the geometric shapes have been removed.

The preferred embodiments allow efficiently forming a matrix layer structure using Archimedes principle of buoyancy to float the spheres in a liquid. Referring to FIG. 7A, a layer of liquid 710 is placed in a suitable receptacle. Spheres of different sizes are then placed in the receptacle. We assume the average density of each sphere is identical for all sizes of spheres. If we select a liquid with an average density of twice the average density of the spheres, the spheres will float on the liquid at exactly their equators, regardless of the size of the spheres. This allows all of the spheres to be packed together to fill the gaps between large spheres without overlapping, in a way that aligns the spheres so the same percentage of a sphere's height is within the solidifiable liquid for all spheres, regardless of their size. Because each sphere is embedded in the solidifiable liquid the same percentage, the resulting matrix layer is "controlled-depth."

If the liquid used is a solidifiable liquid, then once the spheres are packed together and floating as shown in FIG. 7A, the liquid layer 710 may be solidified. Once solidified, the top portion of the spheres may be removed by a suitable process, resulting in a matrix of hemispheres embedded within the solidified layer. Because the matrix includes small hemispheres in between the larger hemispheres, the optical quality of a screen fabricated from the matrix is greatly improved, because the area in gaps between spheres is greatly reduced. The process for removing the top portion of the spheres may be any suitable process, including sanding, cutting, grinding, fracturing, etching, sublimation, etc.

Figure 8A:
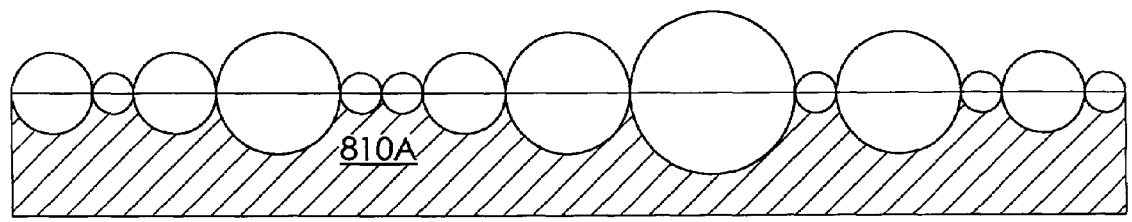
FIG. 8A is a cross-sectional view of a plurality of solid transparent geometric shapes suspended in a liquid in accordance with the preferred embodiments.
Figure 8B:
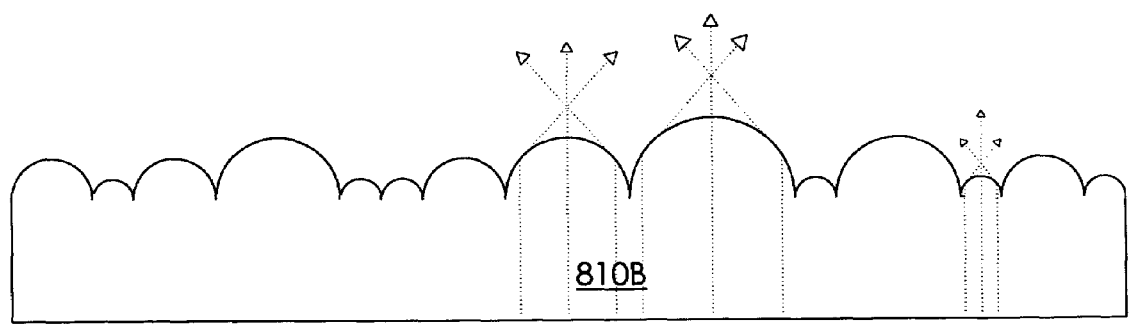
FIG. 8B is a cross-sectional view of the plurality of geometric shapes in FIG. 8A after the liquid has been solidified into a transparent solid.

Another example is shown in FIGS. 8A and 8B to illustrate how a matrix could be fabricated for a rear projection screen. We assume for this example that the spheres are transparent with a given refractive index n. We further assume that the liquid layer 810A is a solidifiable layer with a density twice the average density of the spheres, causing the spheres to float at their equators. We also assume that the liquid layer 810A is transparent when solid with the same refractive index n as the spheres. In this scenario, the transparent spheres are floated on the liquid layer 810A as shown in FIG. 8A, and are packed together using a gentle force to eliminate as many gaps as possible without causing the spheres to overlap. At this point the liquid layer 810A is solidified into a transparent sheet. Because the refractive index of the spheres and the solidified layer 810B is the same, the result is a matrix layer structure shown in FIG. 8B that allows light to enter the solidified layer 810B and exit the spheres as shown, resulting in good performance for a rear projection screen.

Figure 9A:
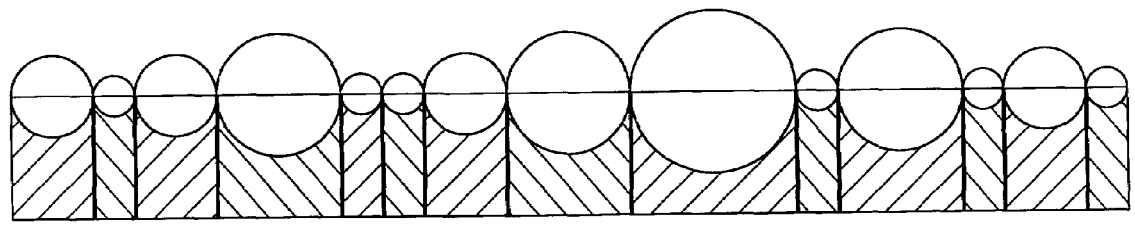
FIG. 9A is a cross-sectional view of a plurality of solid transparent geometric shapes that include baffles in accordance with the preferred embodiments.
Figure 9B:
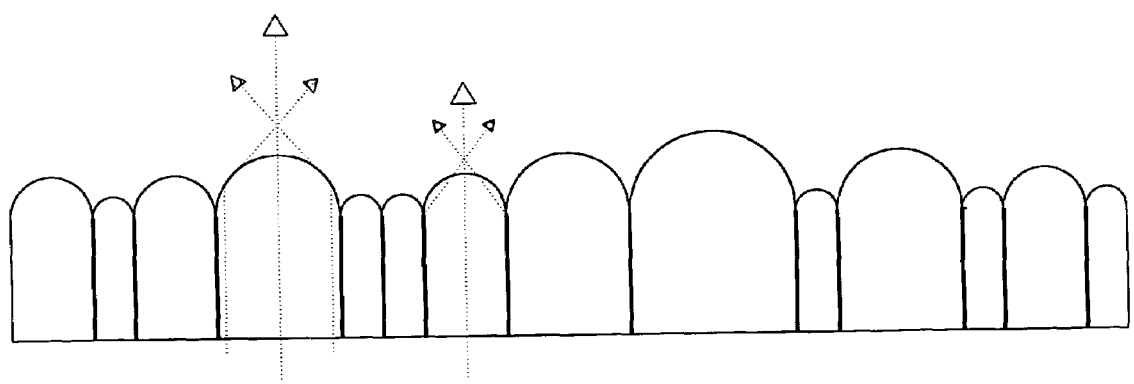
FIG. 9B is a cross-sectional view of the plurality of geometric shapes in FIG. 9A after the liquid has been solidified into a transparent solid.

Yet another example uses baffles to accept projected light from a desired direction while rejecting (by absorption) light from other directions. Referring to FIGS. 9A and 9B, spheres could be fabricated to include a cylindrical portion that extends from a radius of the sphere in one direction. These cylindrical portions could be formed in a way that the spheres float in a liquid layer with the cylindrical portions facing down, as shown in FIG. 9A. The liquid layer could then be solidified. Assuming the spheres are transparent, and the solidified liquid is also transparent, the result is a structure with baffles that accept projection light for each sphere, as shown in FIG. 9B, while rejecting off-axis, non-projection light.

Figure 10A:
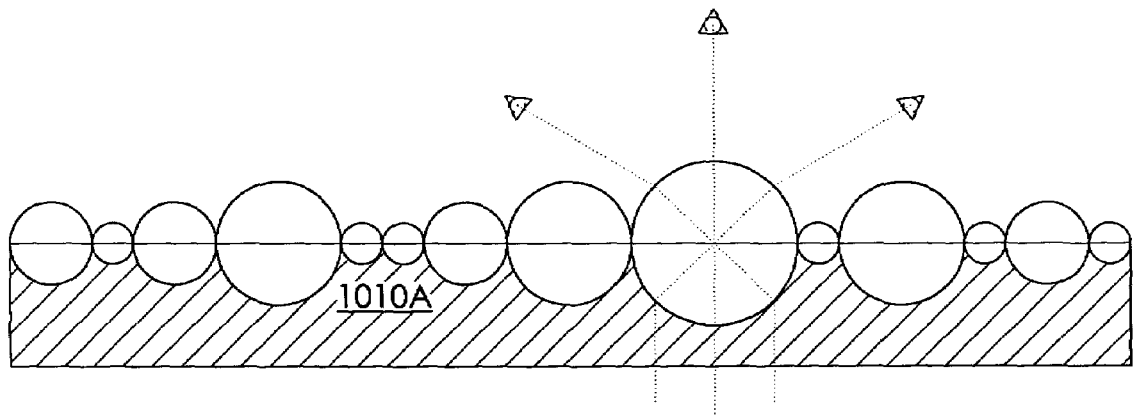
FIG. 10A is a cross-sectional view of a plurality of solid transparent geometric shapes in a layer that has a smaller index of refraction in accordance with the preferred embodiments.
Figure 10B:
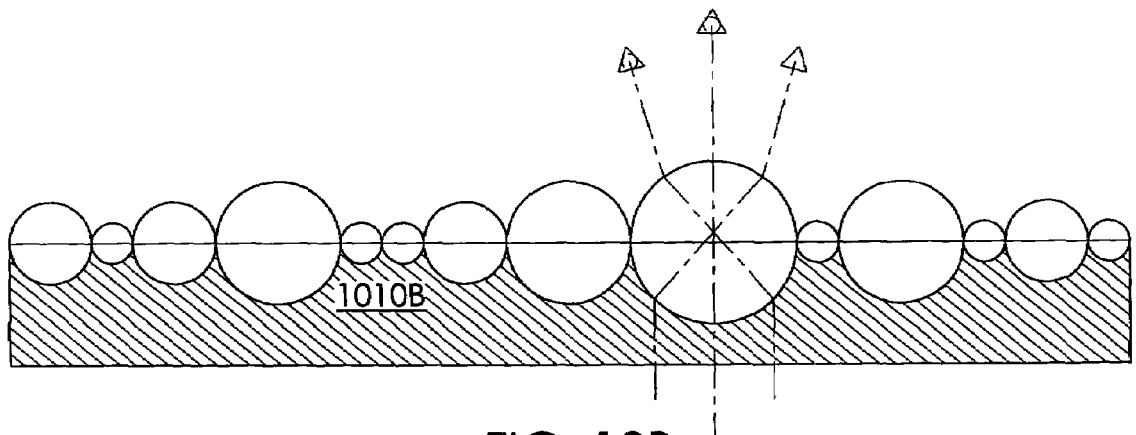
FIG. 10B is a cross-sectional view of a plurality of solid transparent geometric shapes in a layer that has a larger index of refraction in accordance with the preferred embodiments.

The examples in FIGS. 8A and 8B show the result of matching the index of refraction of the solidifiable layer with the index of refraction of the spheres, namely that the interface between the two disappears, as shown in FIG. 8B. In some applications, it may be desirable to control the direction of light exiting the spheres. This may be accomplished in the preferred embodiments by selecting a solidifiable layer that has an index of refraction, when solidified, that is different than the index of refraction for the spheres. A difference in the index of refraction between the solidified layer and the spheres causes light to bend at the interface between the two. FIG. 10A illustrates an example where the solidified layer 1010A has an index of refraction less than the refractive index of the spheres. This causes the light to bend at the layer/sphere interface as shown, resulting in a different pattern of light exiting the spheres when compared to the example in FIG. 8B that represents the same index of refraction for the spheres and the solidified layer. FIG. 10B illustrates another example where the solidified layer 1010B has an index of refraction greater than the index of refraction of the spheres. This causes the light to bend at the layer/sphere interface as shown, resulting in yet a different pattern of light exiting the spheres when compared to the example in FIG. 8B. FIGS. 10A and 10B graphically illustrate that one can achieve different optical characteristics for the matrix layer structure of the preferred embodiments by suitably selecting the index of refraction of the solidified layer when compared to the index of refraction of the spheres.

Figure 11A:
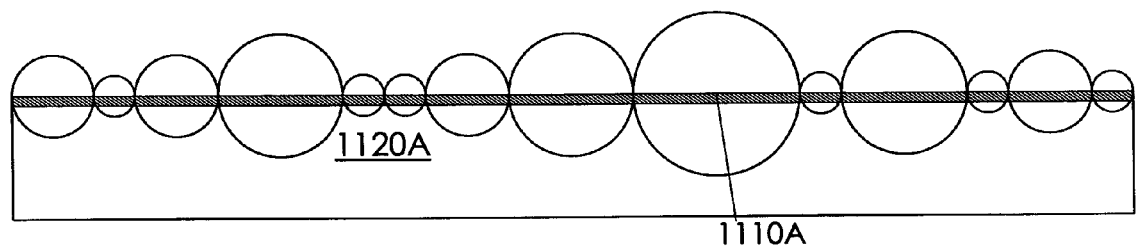
FIG. 11A is a cross-sectional view of a plurality of transparent geometric shapes suspended in two different liquid layers in accordance with the preferred embodiments.
Figure 11B:
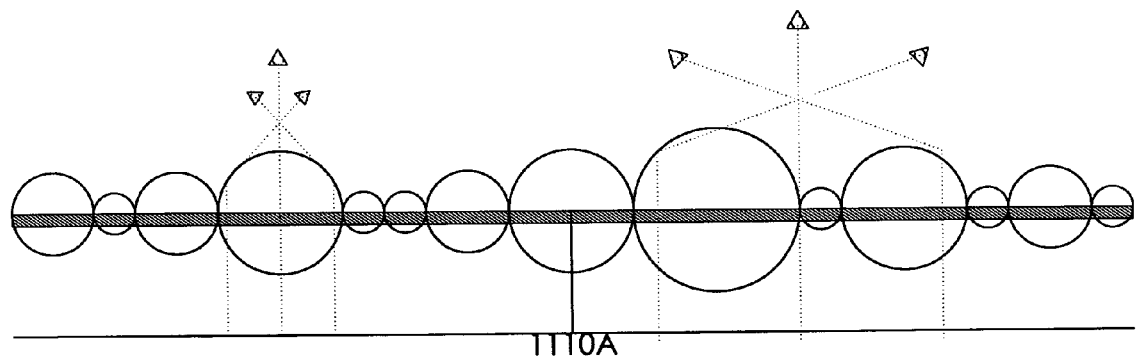
FIG. 11B is a cross-sectional view of the plurality of geometric shapes in FIG. 11A after the thin layer has been solidified into a transparent solid and the second layer of liquid is removed.

In one specific embodiment, multiple layers of immiscible fluids are used. In the simple example in FIG. 7A, there are actually two layers of fluids: air, and solidifiable liquid 710. These fluids are immiscible, meaning they do not mix and the interface between the two is a well-defined horizontal plane. The example in FIGS. 11A and 11B show the use of two immiscible liquid layers. The top layer 1110A is a solidifiable liquid, while the bottom layer 1120A is a liquid layer that preferably does not solidify. FIGS. 11A and 11B illustrate that different layers of liquid may be used to achieve a desired profile of the spheres within a solidifiable layer. For example, if the combined density of the solidifiable layer 1110A and the liquid layer 1120A is three times the average density for the spheres, the spheres will float higher in the liquids, because a smaller proportion of each sphere is needed to displace fluid equal to the total mass of each sphere. If the upper of the layers is sufficiently thin, then two thirds of each sphere will be above that layer. Similarly, if the combined density of the solidifiable layer 1110A and the liquid layer 1120A is 1.5 times the average density for the spheres, the spheres will float lower in the liquids, because the mass of each sphere is displaced by less of the proportional volume of the sphere. This discussion above shows how the profile of the spheres may be altered by appropriately selecting the density of the spheres and the density of one or more liquids used to suspend the spheres.

In the example shown in FIGS. 11A and 11B, we assume the solidifiable layer 1110A in FIG. 11A is solidified, and the liquid layer 1120A is removed, resulting in the structure shown in FIG. 11B. Assuming the spheres are transparent, the result is a matrix structure that can be used to fabricate a rear projection screen with good optical characteristics.

Figure 12:
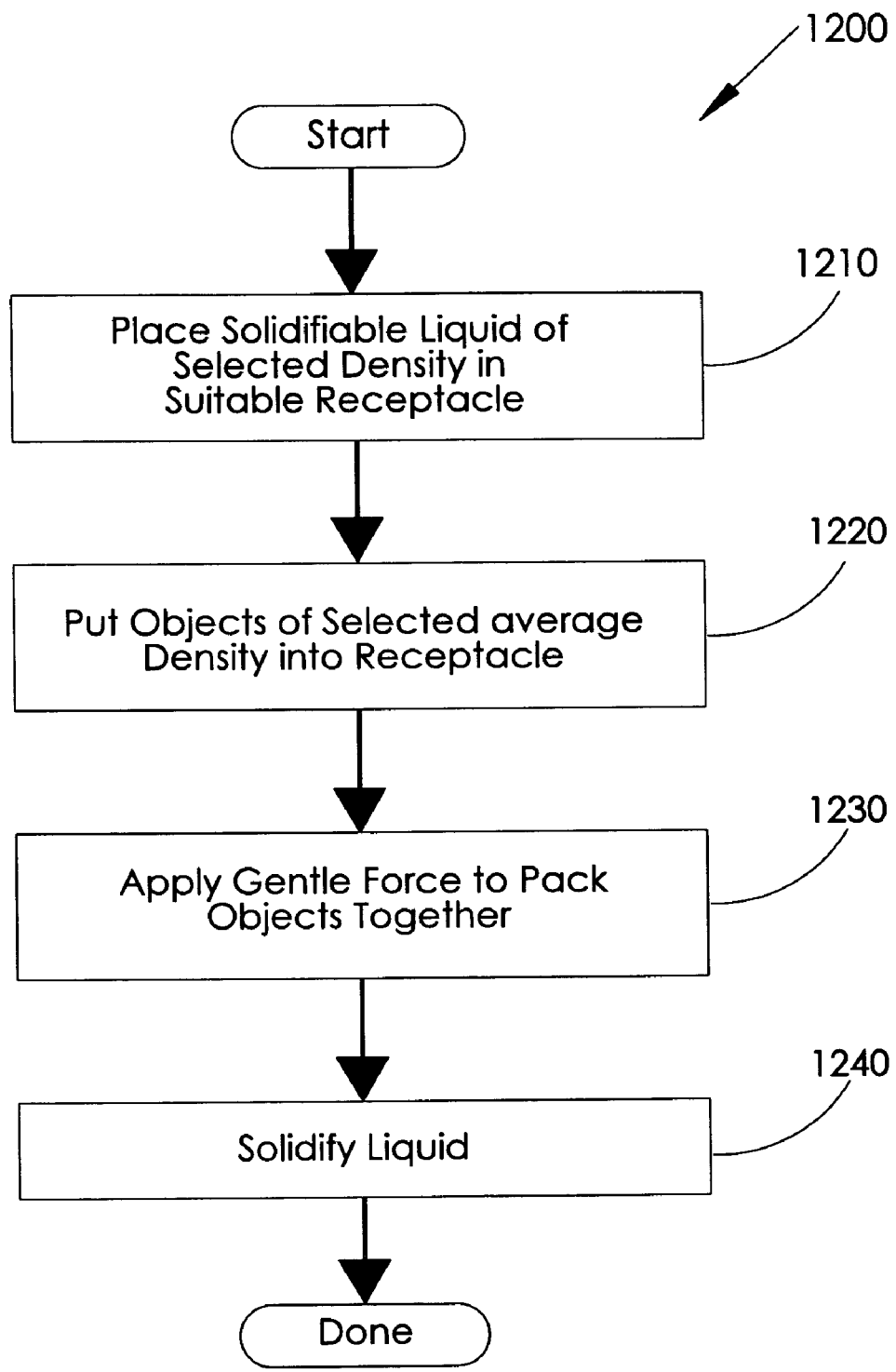
FIG. 12 is a flow diagram of a process for manufacturing the multi-object controlled-depth matrix layer structure in accordance with the preferred embodiments.

Referring to FIG. 12, a process 1200 in accordance with the preferred embodiments for fabricating a matrix layer structure begins by placing a solidifiable liquid of a selected density into a suitable receptacle (step 1210). The geometric shapes, or objects, that have a selected (preferably lower) density are then placed into the receptacle (step 1220). A gentle force is then applied to pack the objects together (step 1230). One example of a gentle force is a mechanical barrier that is moved until the desired packing of objects is achieved. Another example of a gentle force is blowing air or another gaseous fluid on the objects, causing them to migrate together without overlapping. Yet another example of a gentle force is a magnetic field. Once the objects are in the desired locations, the solidifiable liquid is solidified (step 1240). Note that step 1230 is optional because the surface area of the receptacle and the quantity of objects could be controlled to achieve the desired packing without a gentle force to pack them together. In addition, other steps may also be performed within the scope of the preferred embodiments, such as coating the spheres with a reflective coating, and removing a portion of the spheres after the liquid solidifies.

Note that many variations are within the scope of the preferred embodiments. For example, the spheres illustrated in the drawings are one suitable geometric shape within the scope of the preferred embodiments. However, any suitable shape could be used, including hemispheres, tetrahedrons, dodecahedrons, pyramids, and irregular shapes, whether closed or open. In addition, any combination of shapes and sizes could be used within the scope of the preferred embodiments. As stated above, each geometric shape could be a shell with a hollow interior. The hollow interior could also be filled with any suitable material to produce a geometric shape with a desired average density. In addition, each geometric shape could be made of a single, solid material, or could be made of multiple solid materials. Thus, a sphere could be made of one hemisphere that has a greater density than the other hemisphere, causing the hemisphere with the greater density to be disposed downward in the liquid. In this manner, a matrix layer structure with multiple layers of different materials could be efficiently produced.

It is possible within the scope of the preferred embodiments to produce multiple parallel layers of geometric shapes that are each entrapped within a different layer of solidifiable liquid. This would require careful selection of the densities of the liquid layers, solidifiable layers, and shapes so that shapes of one density would suspend to one level where they would be surrounded by a first solidifiable liquid, while shapes of a lighter density would suspend to a higher level where they would be surrounded by a second solidifiable liquid that has a density less than the first solidifiable liquid. In this manner, many different layers could be formed simultaneously using the principles of the preferred embodiments.

The geometric shapes may also be functional, such as phosphorescent shapes, liquid crystals, magnetic shapes, etc. In addition, groups of the shapes could be made electrically or optically addressable by the addition of suitable electrical or optical conductors. Thus, different rows of the shapes could be made separately addressable, or each individual shape could be potentially made to be individually addressed, either electrically or optically. In addition, different matrix structures of the preferred embodiments could be stacked in layers, with addressability extending to any suitable level of granularity, from individual shapes, rows, columns, regions, layers, etc. The combination of functional shapes and addressability of the shapes makes is possible to use the present invention for many new and useful applications.

The term "solidifiable liquid" as used herein broadly includes any liquid that is capable of achieving any degree of solidification to keep the spheres in fixed relative positions with respect to each other. Examples of suitable solidifiable liquids include: ultraviolet-cured epoxy or thermal cured epoxy from Epoxies, Etc. at 21 Starline Way, Cranston, R.I. 02921; an ultraviolet-cured acrylate known as UVEKOL from Cytec Surface Specialities at 1950 Lake Park Drive, Syrna, Ga. 30080; 266 epoxy from Applied Poleramic, Inc. at 6166 Egret Court, Benicia, Calif. 94590, as well as any of the casting resins available from hobby stores.

The number of layers of immiscible liquids could also vary, from one to any suitable number. Each sphere will sink into the layers of liquid to the depth where the mass of the displaced fluid layers is equal to the mass of the sphere. By appropriately selecting the density of the spheres and one or more liquid layers, each identical sphere will sink into the liquid layer(s) to the same latitude on the sphere, even though the spheres are different sizes. Thus, increasing the density of the spheres or decreasing the density of the liquid(s) causes the spheres to sink more into the liquid, while decreasing the density of the spheres or increasing the density of the liquid(s) causes the spheres to sink less into the liquid. Water, oil, glycerine and other immiscible liquids may be used as layers within the scope of the preferred embodiments.

The present invention depends upon the principle of buoyancy. The geometric shapes literally suspend within the liquid layer(s). For buoyancy to occur, it is necessary that at least one fluid beneath the geometric shape have a density greater than the effective average density of the geometric shape and that the same fluid be of depth greater than the depth to which the geometric shape must sink in order to meet the displacement equality requirements. By using several layers of immiscible fluids of different densities for geometric shapes of various sizes, the relative heights of the geometric shapes relative to one another can be tuned to whatever profile is desired. These principles of displacement and buoyancy govern how the shapes float in the liquid layer(s), regardless of the specific shapes used.

Note that achieving a uniform average density for geometric shapes of different sizes is easy when the shapes are solid and made of a single, homogenous material, but may be more difficult when the shapes are hollow. The average density of a hollow shape is a function of the thickness of the shell, the density of the shell material, and the amount and density of any material placed in the hollow interior. By controlling the shell thickness, shell material, and type and quantity of material placed inside the hollow interior, geometric shapes of different sizes may be fabricated that have an average density that is relatively uniform.

The densities of materials used may vary with temperature. As a result, varying the temperature of the spheres or liquids as a way to achieve a desired density is expressly within the scope of the preferred embodiments.

Once one or more of the layers is solidified, the spheres are captivated in the solid layer, with each sphere being a controllable percentage embedded into the layer. The result is a multi-object matrix layer structure that includes multiple geometric shapes that are all embedded a specified percentage in the solidified layer. Note that the term "specified percentage" as used herein is used broadly to include an acceptable range that allows for small process variations to occur that are still within the scope of the preferred embodiments. For example, the selection of a solidifiable liquid with twice the average density of the spheres should result in each sphere floating at exactly its equator. However, variations in the densities of the spheres may result in spheres that have similar average densities within a certain range, instead of spheres that have virtually identical average densities. The result is that the spheres will be embedded in the solidified layer within a range of percentages that is governed by the density differences between spheres. In the example above, the "specified percentage" is 50%. However, due to variations in sphere densities, the specified percentage of each sphere that is embedded in the layer may vary from 45-55%, for example. The term "specified percentage" herein expressly includes ranges of percentages within the scope of the preferred embodiments.

BEST MODE OF THE INVENTION

An example formula for producing a sheet of transparent spheres might use acrylic (PMMA) balls and/or polycarbonate spheres (such as available from K-mac Plastics, 3821 Clay Ave SW, Grand Rapids, Mich. 49548), with PMMA typically having an index of refraction near 1.49 and a density of 1.18 g/ml and polycarbonate typically having an index of refraction near 1.59 and a density of 1.2 g/ml. Sizes for this example might be 1.5-inch, 0.625-inch and 0.25-inch, used in equal number.

These spheres are put onto a surface of aqueous silver nitrate having a density of about 2.4 g/mm. Silver nitrate in water can be diluted to various concentrations to achieve densities between 1.0 and 2.9 g/ml, depending upon temperature. A thin (approximately 1-mm) layer of UVEKOL is floated on the top of the aqueous solution and, as it is immiscible with water and of lower density (1.09 g/ml), the UVEKOL layer remains separated. Under these conditions, all of the plastic spheres will suspend within the UVEKOL layer at their equators. With, for example, UVEKOL UV 60-7155, the layer will solidify and adhere to the plastic balls after approximately 15 minutes of illumination with a standard black light. The sheet of transparent plastic balls, all held at their equators, can be removed and further processed as desired.

Another example formula would use equal-diameter glass spheres, which are available from many vendors, including Industrial Tectonics, 7222 W. Huron River Drive, Dexter, Mich. 48130. One choice, borosilicate glass spheres, has a density of 2.23 g/ml. This high density might seem a problem to the creation of a sheet of spheres connected with their equators all in the same plane. However, when these spheres are put onto a surface of methylene iodide diluted with benzol (benzene), (both being available from standard chemical suppliers such as H&S Chemical Co. Inc., 1025 Mary Laidley Drive, Covington, Ky. 41017), they will not submerge into the fluid. Methylene iodide has a density of 3.32 g/ml and benzol has a density of 0.88 g/ml. Therefore, the dilution ratio of the two constituents can be adjusted to achieve any density between 0.88 and 3.32. In the case of this example, wherein the objective is to suspend the transparent spheres at their equators, whereat a solidifiable layer can fixate them, the methylene iodide and benzol dilution is adjusted to achieve a specific condition when an additional layer is applied above the methylene iodide/benzol solution. A thick (equal to or greater than the radius of the sphere) water-based, transparent-drying glue layer (such as "Elmer's Glue") is floated upon the methylene iodide/benzol solution. Because the solutions are immiscible, the layers stay separated. When the densities of the methylene iodide/benzol solution and the water-based glue solution are appropriately set, the separation plane between the two layers will include the equators of the spheres. After the glue sets, the dried glue block can be lifted off the methylene iodide/benzol solution. The surface of the block now holds all the spheres imbedded to the depth of their equators.

The preferred embodiments provide a way to create a matrix structure that includes a plurality of shapes embedded into a solidified layer a selectable percentage. The result is a matrix layer structure that achieves excellent optical characteristics at a reasonable cost.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An article of manufacture comprising:
   a plurality of different sized geometric shapes; and
   a layer interconnecting the plurality of geometric shapes, wherein each of the plurality of geometric shapes is within the layer a specified percentage less than 100%.

2. The article of manufacture of claim 1 wherein the plurality of geometric shapes comprise spheres.

3. The article of manufacture of claim 1 wherein the plurality of geometric shapes comprise hemispheres.

4. The article of manufacture of claim 1 wherein the plurality of geometric shapes are hollow.

5. The article of manufacture of claim 1 wherein the plurality of geometric shapes are solid.

6. The article of manufacture of claim 1 wherein the plurality of geometric shapes are transparent.

7. The article of manufacture of claim 1 wherein the plurality of geometric shapes are reflective.

8. The article of manufacture of claim 1 wherein the plurality of geometric shapes comprise baffles.

* * * * *